United States Patent

Kuo-An

[11] Patent Number: 6,142,268
[45] Date of Patent: Nov. 7, 2000

[54] RADIATOR DEVICE FOR BICYCLE SHOCK-ABSORBER

[75] Inventor: Pai Kuo-An, Tai Ping, Taiwan

[73] Assignee: Acecast Industry Co., Ltd., Tai Ping, Taiwan

[21] Appl. No.: 09/359,897

[22] Filed: Jul. 26, 1999

[51] Int. Cl.⁷ ........................................ F16F 9/42
[52] U.S. Cl. .............................. 188/274; 267/221
[58] Field of Search .................. 188/274, 276; 267/34, 221

[56] References Cited

U.S. PATENT DOCUMENTS

| | | | |
|---|---|---|---|
| 3,795,291 | 3/1974 | Naito et al. | 188/274 |
| 4,616,810 | 10/1986 | Richardson et al. | 188/274 |

FOREIGN PATENT DOCUMENTS

| | | | |
|---|---|---|---|
| 165614 | 3/1954 | Australia | 188/274 |
| 767756 | 2/1957 | Germany | 188/274 |
| 1154818 | 7/1956 | United Kingdom | 188/274 |
| 758798 | 10/1956 | United Kingdom | 188/274 |

*Primary Examiner*—Chris Schwartz
*Attorney, Agent, or Firm*—Harrison & Egbert

[57] ABSTRACT

A bicycle shock-absorber is composed of an oil cylinder, a nut, a spring, a cover, and a radiator. The outer thread of the oil cylinder is engaged with the nut and the spring. The radiator is constructed of two corresponding half ring which are united by two bolts passing through at the sides to make the half rings to be affixed firmly around the oil cylinder. The radiator is mounted under the nut so as to cause the nut to resist the pressure of the spring. The radiator has a plurality of blades at intervals which can heat exchange with the air and dissipate heat while the bicycle is moving.

2 Claims, 3 Drawing Sheets

RADIATOR DEVICE FOR BICYCLE SHOCK-ABSORBER

FIELD OF THE INVENTION

The present invention relates generally to a radiator, and more particularly to the radiator device for a bicycle shock-absorber.

BACKGROUND OF THE INVENTION

As shown in FIG. 1, the conventional bicycle shock-absorber 10 is constructed of a cylinder 11 provided with an outer thread 12 on the surface. The outer thread 12 is engaged with a nut 13 and a spring 14. While the upper center rod 15 of the shock-absorber 10 receives a shock and retracts into the cylinder 11, the spring 14 follows in its elasticity to compress. Such structure is defective in design in that the shock-absorber 10 encounters friction forces and is heated as a result thereof. Therefore, the rubber material of the sealed ring in the interior of the cylinder 11 is easily destroyed and deformed by the heat. In addition, the spring 14 is retained by the nut 13 and the nut 13 is easily worsened from its position resulting from expansion and compression of the spring 14. Therefore, the spring 14 of the shock-absorber 10 can not adjust in location.

SUMMARY OF THE INVENTION

The primary objective of the present invention is to provide a radiator device for a bicycle shock-absorber.

In keeping with the principle of the present invention, the foregoing objective of the present invention is attained by a special structure combination of a radiator and the shock-absorber free from the shortcomings of the conventional bicycle shock-absorber described above.

The objective, features and functions of the present invention will be more readily understood upon a thoughtful deliberation of the following detailed description of a preferred embodiment of the present invention with reference to the accompanying drawings.

DETAILED DESCRIPTION OF THE INVENTION

Figure 1:
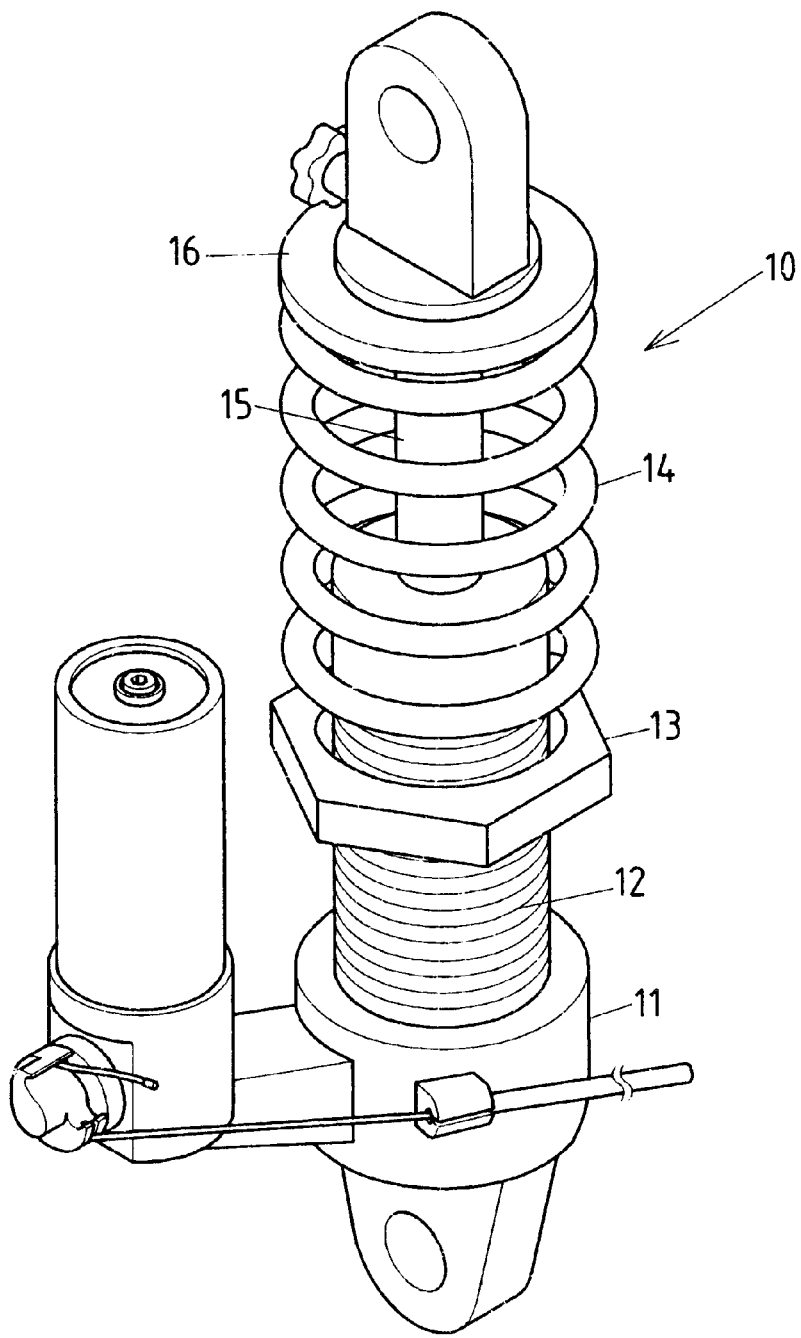
FIG. 1 shows a perspective view of a bicycle shock-absorber of the prior art.
Figure 2:
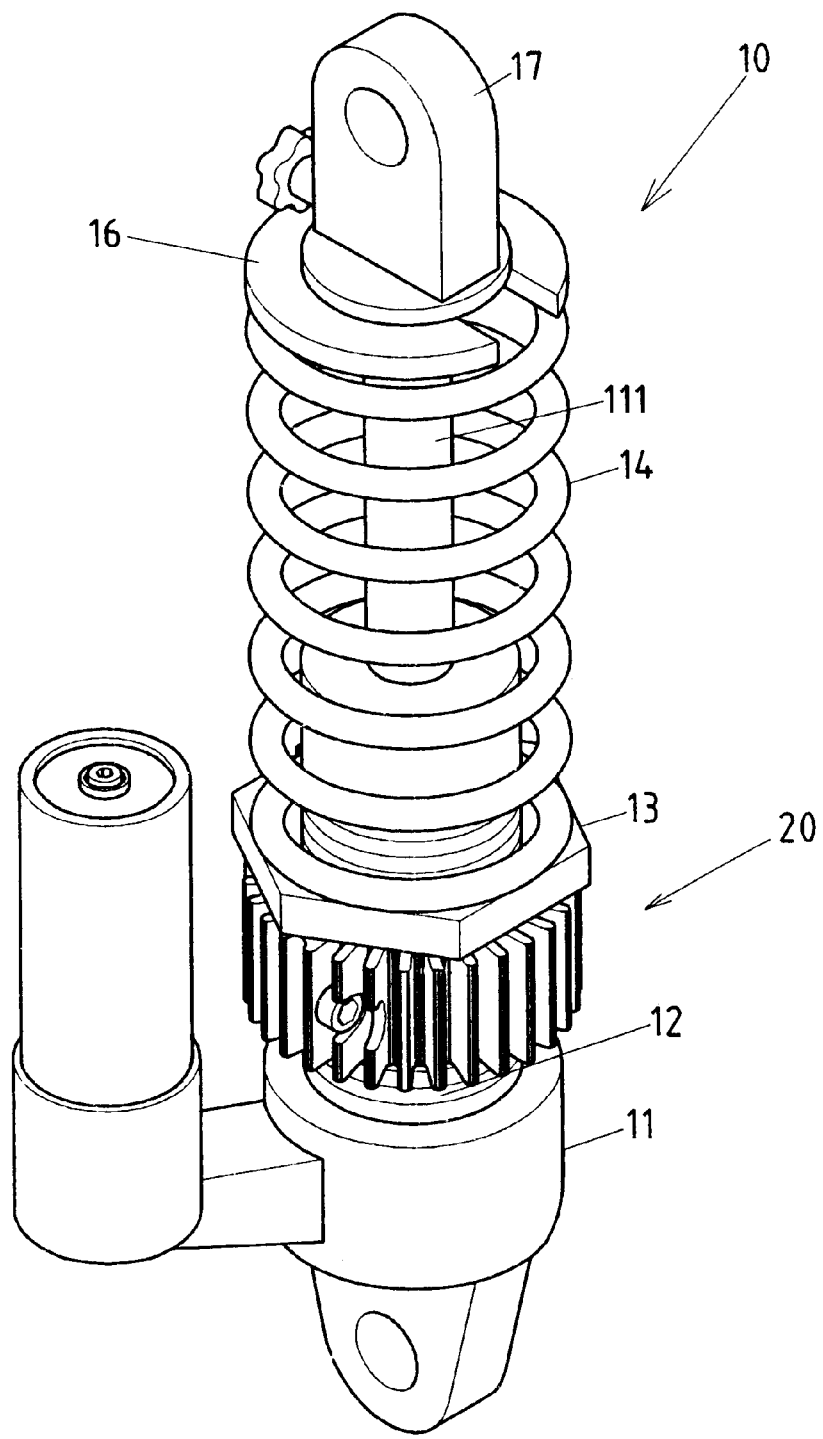
FIG. 2 shows a perspective view of the present invention in combination.
Figure 3:
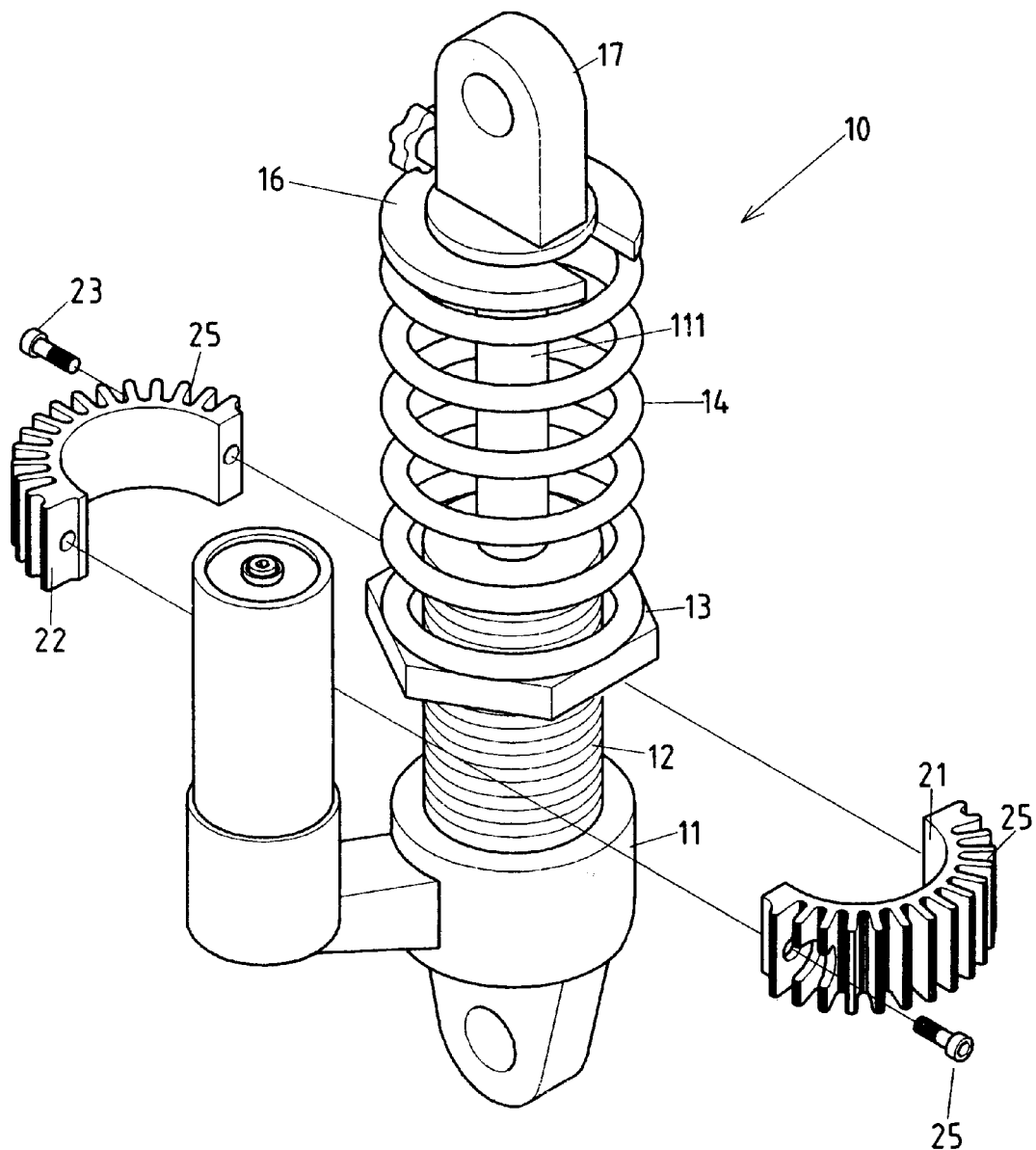
FIG. 3 shows an exploded view of the present invention.

As shown in FIGS. 2 and 3, a shock-absorber is comprised of an oil cylinder 11, a nut 13, a spring 14, a cover 16, and a radiator 20.

The oil cylinder 11 is provided with an outer thread 12 on the surface and the upper center rod 111 of the oil cylinder 11 is provided with a connect seat 17 at one top end thereof.

The nut 13 is mounted on the outer thread 12 of oil press jar 11.

The spring 14 is located between the upper side of nut 13 of the oil cylinder 11 and the connect seat 17.

The cover 16 is mounted beneath the connect seat 17 so that the top end of spring 14 is restrained at the bottom of the cover 16.

The radiator 20 is constructed of two relatives corresponding half rings 21, 22 which are united by two bolts 23, 25 passing through at the sides to make the half rings 21, 22 fixed firmly around the oil cylinder 11. The radiator 20 is mounted under the nut 13 so as to resist movement of the nut 13 caused by the action of the spring 14. The radiator 20 is further formed with a plurality of blades 25 on the outer circumference.

It is a feature of the present invention wherein the shock-absorber 10 can also be made of a single piece engageable with the oil cylinder 11.

The present invention has the advantages which are described hereinafter.

1. The radiator 20 is composed of two half rings 21, 22 matching to the various outer circumferences of oil cylinder 11 of the shock-absorber 10. Therefore the present invention is convenient in installing.
2. The radiator 20 is retained under the nut 13 to provide the nut 13 with further resistance against the compressive forces of the spring 14. Therefore the present invention can prevent the nut 13 from loosening.
3. The radiator 20 has a plurality of blades 25 at intervals which can heat exchange with the air and dissipate heat therefrom while the bicycle is moving. Therefore the present invention can improve the life-span of the shock-absorber 10.
4. The radiator 20 can match with the nut 13 to rotate downward in adjusting, so that the spring 14 can be loosened and the cover 16 can be taken off. Therefore the spring 14 of the present invention can be adjusted or substituted to any force as required.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A shock-absorber device comprising:
    an oil cylinder having a threaded outer surface, said oil cylinder having a center rod extending upwardly and outwardly therefrom, said center rod having a connect seat at a top end thereof;
    a nut mounted on said threaded outer surface of said oil cylinder;
    a spring positioned between an upper side of said nut and said connect seat;
    a cover affixed beneath said cover seat, said cover retaining a top end of said spring; and
    a radiator formed of two half rings united by two bolts passing through respective sides thereof so as to fix said radiator around said oil cylinder, said radiator positioned below and against said nut so as to resist a pressure from said spring, said radiator comprised of a plurality of blades extending radially outwardly therefrom.

2. A shock-absorber device comprising:
    an oil cylinder having a threaded outer surface, said oil cylinder having a center rod extending upwardly and outwardly therefrom, said center rod having a connect seat at a top end thereof;
    a nut mounted on said threaded outer surface of said oil cylinder;
    a spring positioned between an upper side of said nut and said connect seat;
    a cover affixed beneath said cover seat, said cover retaining a top end of said spring; and
    a radiator formed of a single piece and affixed around said oil cylinder, said radiator positioned below and against said nut so as to resist a pressure from said spring, said radiator comprised of a plurality of blades extending radially outwardly therefrom.

* * * * *